United States Patent [19]

Lohmann

[11] 3,886,381

[45] May 27, 1975

[54] ELECTRONIC STORAGE CIRCUIT FOR DIGITAL DATA PROCESSING DEVICES WITH HIGH FAULT SAFETY IN PARTICULAR FOR RAILROAD SAFETY SYSTEMS

[75] Inventor: Heinz-Juergen Lohmann, Braunschweig, Germany

[73] Assignee: Siemens Aktiengesellschaft, Berlin & Munich, Germany

[22] Filed: Jan. 30, 1974

[21] Appl. No.: 437,912

Related U.S. Application Data

[63] Continuation of Ser. No. 266,549, June 27, 1972, abandoned.

[52] U.S. Cl. .................................. 307/238; 307/291

[51] Int. Cl. ........................ G11c 11/34; H03k 3/286

[58] Field of Search .................... 307/211, 238, 291

[56] References Cited

UNITED STATES PATENTS 3,588,546 6/1971 Lagemann .......................... 307/291

*Primary Examiner*—John Zazworsky

*Attorney, Agent, or Firm*—Hill, Gross, Simpson, Van Santen, Steadman, Chiara & Simpson

[57] ABSTRACT

An electronic storage circuit for digital data processing devices with high fault safety comprises an RS master-slave flip-flop arrangement with a component group for majority decisions connected ahead of the master-slave flip-flop arrangement. The component group has three inputs, one of which is a feedback connection from the slave flip-flop. The other two inputs assume binary switching variables in the form of rectangular voltages and the logical values differ by a phase difference of 180°.

3 Claims, 4 Drawing Figures

ELECTRONIC STORAGE CIRCUIT FOR DIGITAL DATA PROCESSING DEVICES WITH HIGH FAULT SAFETY IN PARTICULAR FOR RAILROAD SAFETY SYSTEMS

This is a continuation of application Ser. No. 266,549, filed June 27, 1972, and now abandoned.

BACKGROUND OF THE INVENTION

1. Field of the Invention

This invention relates to an electronic storage circuit for digital data processing devices with high fault safety, in particular for railroad safety systems, for processing binary switching variables in the form of rectangular signal voltages of a given repetition frequency and employs a RS master-slave flip-flop arrangement having a timing pulse inverter for the slave flip-flop.

2. Description of the Prior Art

Modern switching mechanisms in the digital data processing field operate in steps. For this purpose, the processing of the digital signals occurs during a given period of time and the signals emitted at the outputs of the respective switching mechanisms are not only dependent on the signals which are respectively applied to the inputs of the switching mechanism, but are also dependent on those signals which were produced during earlier processing steps. This results in the fact that not only a number of different linkage circuits is required for a switching mechanism of the digital data processing arrangement, but also for storage component circuits. Therefore, flip-flops have become an essential component of such circuit complexes, and flip-flops flops have been employed in most of the different embodiments.

In the field of railroad safety techniques, in particular, and, for example, also in the field of reactor controls, switching mechanisms are required which comply with particularly high safety requirements in order to guarantee data processing for a fairly long period of time without the occurrence of faults which endanger the operation. The demand for smaller sizes and lower costs with an equal requirement for quality of the circuits employed in such systems has brought about the situation that electronic circuit systems are offered on the market without magnetic circuits so that, for example, spacious relay techniques or high cost magnetic ring core techniques can be eliminated. The high safety requirements in the above particular fields have not, however, been taken into consideration in the design of these systems which are now on the market.

Monolithic circuits have been developed for the last few years which excel due to particularly high reliability, high packing density, high switching speed and low cost, as compared to circuits made of individual component elements. The German published application 1,537,379 discloses an integrateable safety circuit for carrying out logical linkages while guaranteeing a high degree of fault safety without requiring that the individual linkage circuits be constructed according to fail-safe principles. With this type of safety circuit, each linkage component is designed with two channels, whereby the two channels contains signals of anti-phase switching varibles, during a normal operation, and an anti-phase condition is controlling independent from the data flow. The term "anti-phase" is intended to means signals which are 180° out of phase.

With this safety circuit for the execution of logical linkages, a proper storage component has heretofore not existed, which is also designed with two channels and which also operates with anti-phase switching variables in the form of rectangular voltages.

SUMMARY OF THE INVENTION

The present invention precedes from the recognition that it is particularly advantageous to select the flip-flop circuit of the RS master-slave flip-flop arrangement among many of the prior art flip-flop circuits as a basis for the development of an electronic storage circuit required for a proper two channel storage component. The principle circuit of an RS master-slave flip-flop is described in detail in the book by Karl Reiss "Integrated Digital Components"—small practical course by the Siemens Aktiengesellschaft Berlin/Munich 1970, Pages 97–98 and 344–345.

The above mentioned flip-flop usually consists of two normal RS flip-flops, whereby the output of one of such flip-flops, the master flip-flop, is connected with both inputs of the second flip-flop, the slave flip-flop. With these flip-flops, the inputs are denoted by R or S, respectively. Both flip-flop stages are designed in such a way that they take the signals applied at their inputs R and S only when a logical 1 is applied to an associated timing input. The timing signal changes periodically between the two states 0 and 1. If a logical 1 timing signal changes to a logical 0, the master flip-flop will be blocked for a further signal intake, while the slave takes over the signals emitted by the master flip-flop, but the master flip-flop will take in information during the timing signal change from a logical 0 to a logical 1. This triggering of the two flip-flop stages can be effected by two different timing signals, which do not coincide. However, in order to supply but a single timing signal, the timing signal required for the slave flip-flop will be derived with the help of a timing negator for the timing signal provided for the master flip-flop.

The desire for a proper electronic storage circuit or a storage component composed thereof as an addition to the prior art safety circuit for carrying out logical linkages is fulfilled, according to the present invention, in that the S input of the master flip-flop is directly connected to a component group which forms a majority decision, with signal inverting, and its R input is connected with the component group by way of a negation member (inverter), and the component group comprises three inputs, two of which are provided for the binary switching variables in the form of reactangular signal voltages whose logical values are represented by a phase difference of 180°, and the third input is connected with that output of the slave stage which is associated with the S input. The timing signal which is required for triggering has twice the given repetition frequency of the rectangular signal voltages, whereby the trailing edges of the timing signal timely coincide with the edges of the signal voltages.

The particular advantage of such an electronic storage circuit for rectangular signal voltages is provided in the fact that it allows the construction of a switching mechanism with linkage members of the prior art safety circuits for carrying out logical linkages additionally with two channel dynamic storage components with signals which are anti-phase with respect to each other on both channels so that each memory component consists of two of these storage circuits whose equal value inputs are fed with anti-phase signal voltages during a normal operation. For this purpose, a device controlling the signal anti-phase is connected to two equal value outputs of each storage component, respectively, which allows an independent, small delay and safe fault announcement. It is therefore not necessary to construct the storage members according to fail-safe principles. Each falsification of the respective storage content due to an interfering influence, or a possible component element failure on a channel, is automatically and safely recorded as a fault, independently of the respective switching state of the storage component or the storage members, respectively, after a timing cycle is finished at the very latest. This feature allows application of the component for meters or shift registers, respectively, if fault safety is demanded from such devices. The two channel storage component, including the device controlling signal phase, can be constructed as an integrated circuit for all cases of application, which leads to particularly small and low cost modern components.

BRIEF DESCRIPTION OF THE DRAWING

Other objects, features and advantages of the invention, its organization, construction and operation will be best understood from the following detailed description of a preferred embodiment thereof taken in conjunction with the accompanying drawing, on which.

DESCRIPTION OF THE PREFERRED EMBODIMENT

Figure 1:
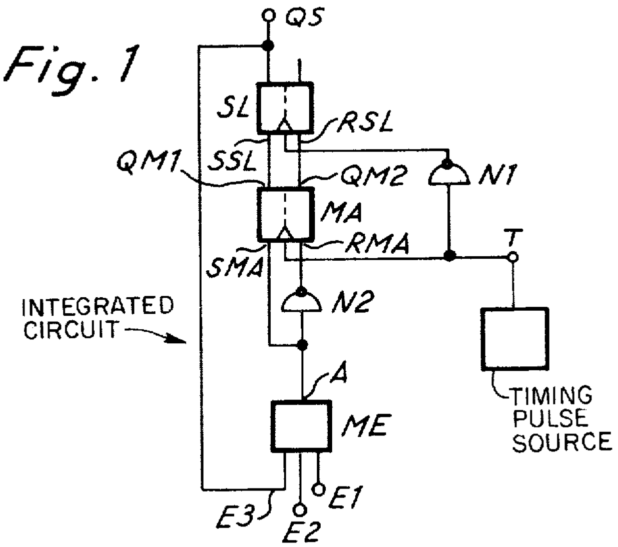
FIG. 1 is a schematic logic circuit diagram of an electronic storage circuit for rectangular signal voltages with a phase difference of 180° for the differentiation between the logical values of the switching variables.

The schematic diagram of FIG. 1 illustrates a storage circuit based on a RS master-slave flip-flop. It comprises a master flip-flop MA and a slave flip-flop SL connected to the outputs of the master flip-flop. The timing signal required for the control of the two flip-flops is directly supplied to the master flip-flop MA via the terminal T and indirectly, via an inverter N1 to the slave flip-flop SL. Furthermore, a component group ME having three inputs E1, E2 and E3 is provided for carrying out a majority decision. The output signal of the circuit ME is inverted with respect to the majority of the signal voltages applied to the mentioned inputs. The output A of the component group ME, on the one hand, is connected with an input SMA of the master flip-flop MA and, on the other hand, with the other input RMA of the master flip-flop MA by way of an inverter N2. An embodiment of the invention may be constructed whereby inversion is not provided in the component group ME. Then, the inverter N2 is not connected with the input RMA, but with another input SMA of the master flip-flop MA. The input RMA of the master flip-flop MA is in such case directly connected with the output A of the component group ME which carries out the majority decision. The output QS of the storage circuit is included in an inverse coupling branch of the RS master-slave flip-flop arrangement and for this reason is connected with the input E3 of the component group ME. The other two inputs E1 and E2 of the component group ME receive the rectangular signal voltages which correspond to the switching variables, having a phase difference of 180° for differentiating between the two logical values. The timing signals supplied by way of the terminal T have twice the repetition frequency of the signal voltages.

The phase position of the timing signals with respect to the signal voltages has been selected in such a way that the trailing edges of the timing signal coincide with the edges of the signal voltages.

Figure 2:
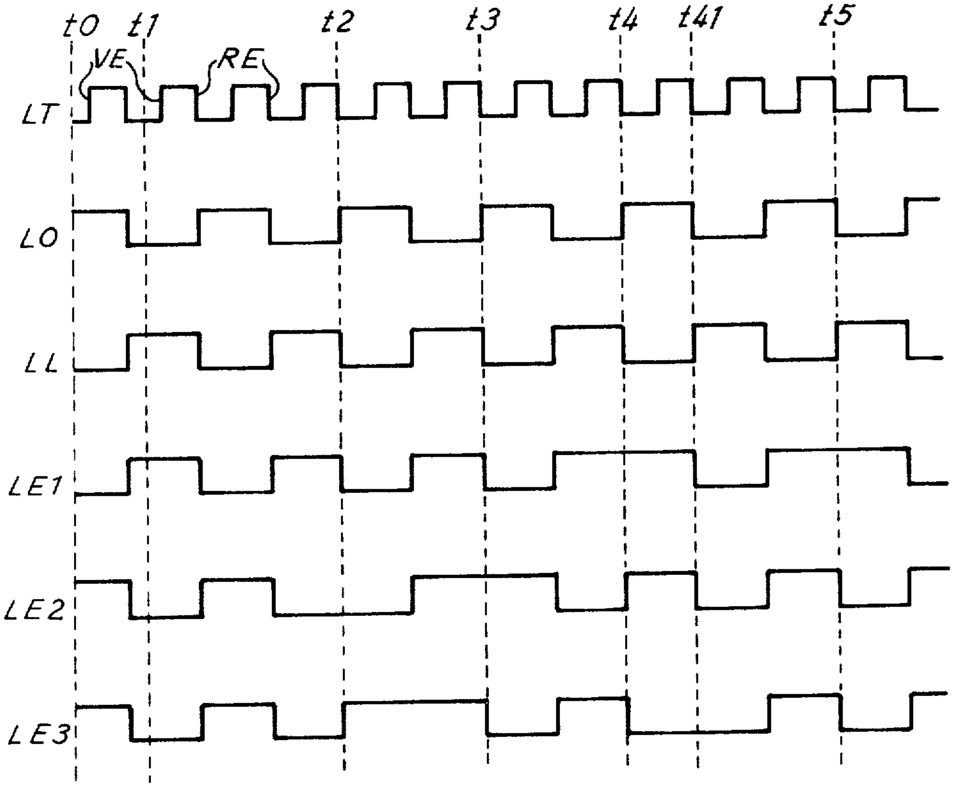
FIG. 2 is a pulse diagram showing the timely succession of different signal voltages in several diagram lines; including the dynamic switching variables defined by their 180° phase difference.

FIG. 2 illustrates in several diagram lines the timely succession of several electric rectangular voltages. The diagram line denoted by LT shows the course of the timing signals applied at the terminal T (FIG. 1), along with the leading edges VE and the trailing edges RE of the timing signals. When the leading edge VE is respectively present, the master flip-flop MA will accept the input signals supplied thereto; thereby, the slave flip-flop SL will be blocked. The latter will accept the signals emitted by the master flip-flop MA, via its outputs QM1 and QM2, respectively, during the trailing edges RE of the timing signals. During this time, the master flip-flop MA will be blocked.

The diagram lines LO and LL show the paths of the two rectangular signal voltages which are phase shifted by 180° with respect to each other, which represent the two possible logical values 0 and 1 of the switching variables and which serve as standard or reference signals. The diagram lines LE1, LE2 and LE3 are associated with three inputs E1, E2 and E3 of the component group ME which forms the majority decision. The input E1 carries low potential at the time $t0$, and the input E2 has a high potential. When the paths of the signal voltages illustrated by the diagram lines LE1, LE2, LO and LL are compared, it can be seen that the input E1 is supplied with the logical 1 and the input E2 with the logical 0. Furthermore, the signal which is emitted by the slave flip-flop SL by way of its output QS and supplied to the input E3, coincides with that one given at the input E2. Therefore, the input E3 is seen to be provided with a logical 0. The information emitted by the output QS states that the storage member is in the reset state. The component group ME for the formation of a majority decision will therefore receive the high potential corresponding to the logical 0 at this time, at the time $t0$, by way of the inputs E2 and E3. After the majority decision and inverting, low potential will result at the output A of the component group ME and this low potential is taken over during the next leading edge VE of the timing signal—diagram line LT—by the master flip-flop MA, by way of its input SMA. Simultaneously, high potential is offered to the other input RMA of the master flip-flop MA, by means of negating through the use of the inverter N2, and it is also accepted by the master flip-flop MA. Therefore, low or high potential, respectively, will be provided at the outputs QM1 and QM2 of the master flip-flop MA, according to the path of the increasing leading edge VE, in order to be taken over by the slave flip-flop SL at its inputs SSL and RSL. The transfer is effected during the following trailing edge of the timing signal. After the trailing edge RE of the timing signal has passed after the instant $t1$, low potential will be provided on the output QS of the slave flip-flop SL and therefore on the input E3 of the component group ME. A comparison with the signal shape in the diagram line LO will then show at once that the dynamic storage circuit will still be in the reset state after the potential change at the output. In the meantime, until the instant $t1$ has been reached, however, the other two signal voltages will have changed on the inputs E1 and E2, without changing their value, in such a way that high potential will be provided at the input E1 and low potential at the input E2. This still corresponds to a logical 1 or a logical 0. It can be clearly recognized from the mode of operation and effect as described above that the logical value of the output signal at the output QS of the slave flip-flop SL does not change, even if a signal alternating between high and low potential is emitted. Since only constantly low or high potential will be emitted during a defect, an interference can easily be recognized.

Nothing changes about the determined logical state until the instant $t2$. After the instant $t2$, the signal supplied to the input E2 changes from the phase of a logical 0 to that of a logical 1. This is equal to an order to set the storage circuit. The majority of the signal voltages supplied to the inputs E1 through E3 of the component group ME has low potential at the instant $t2$, which is equal to a logical 1. During the next leading edge VE of the timing signal, the master flip-flop MA will take over by way of its input SMA a high potential from the output A and, via its input RMA a low potential; the latter are thereafter available at the output QM1 and QM2. In the course of the following trailing edge RE of the timing signal (after the instant $t2$), the slave flip-flop SL will take over these signals offered by the master flip-flop MA, so that still high potential will be provided after the mentioned trailing edge RE of the timing signal at the output QS of the slave flip-flop SL, which is equal to a logical 1 (compare diagram lines LE3 and LL). The order to set the storage circuit, a logical 1 at the input E2, remains constant until the time $t3$. From this time, a signal voltage will be provided at the input E2 which respresents the value logical 0 (compare with the line LO). Therefore, the order to set the storage circuit, given between the instants $t2$ and $t3$, are effectively canceled and the same signal configuration is given at the inputs E1 and E2 of the component group ME between the instants $t3$ and $t4$, as between the instants $t\,0$ and $t2$. The output QS of the slave flip-flop SL, however, still provides a logical 1; the storage circuit therefore is and remains set. Therefore, a logical 1 remains at the input E3. When the diagram lines LE1, LE2 and LE3 are considered until the time $t4$, it can be recognized immediately that the majority of the inputs E1–E3 of the component group ME will contain a logical 1 after the setting process, even without the setting order at the input E2. Due to this, the storage circuit remains set, even if the logical 1 signal at the input E2, which is required for the setting process, is no longer provided.

A logical 0 phase signal will be applied to the input E1 of the storage circuit, in the place of a logical 1 phase signal, in order to reset the storage circuit. The signal voltage for this purpose is illustrated in the diagram line LE1 from the instant $t4$ to the instant $t5$. After the instant $t4$, both inputs E1 and E2 of the component group ME have a high potential which thereby represents a logical 0. Then a changed signal configuration for the master flip-flop MA will result from the majority decision, along with a transfer during the next leading edge VE of the timing signal and a further transfer to the slave flip-flop SL during the following trailing edge RE of the timing signal. After this trailing edge, the output QS of the slave flip-flop SL is at a low potential which corresponds to the output of a logical 0 (compare diagram lines LE3 and LO at the instant $t41$). Therefore, the storage circuit is reset, and the state given originally at the time $t0$ is reached again.

Figure 3:
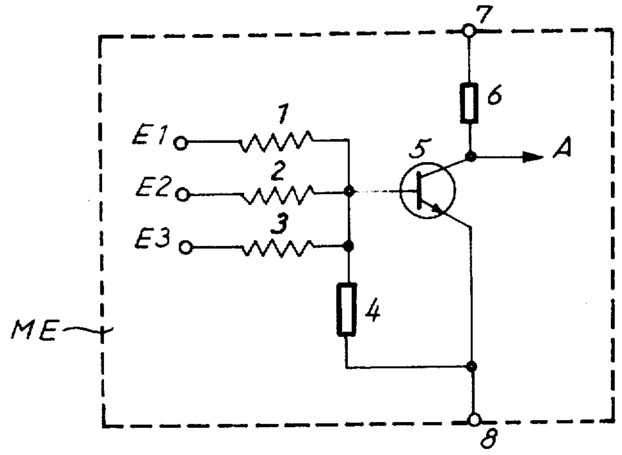
FIG. 3 is a circuit diagram for a majority decision arrangement having signal inversion.

The circuit according to FIG. 3 illustrates a preferred embodiment of the component group ME for the formation of a majority decision with signal inversion. An essential component of this circuit is a resistor matrix having a plurality of resistors 1–3 which simultaneously represent the inputs E1–E3, and a resistor 4. The higher the number of inputs E1–E3 which are at a high potential, the greater the current through the resistor 4 will be, whose voltage drop serves for controlling a transistor 5. The switching path of the transistor 5 is connected between the terminals 7 and 8 for receiving a constant current supply, by way of an operational load resistor 6. The output of this component group is denoted by A, as in the arrangement according to FIG. 1. The switching threshold of the transistor 5 is defined in such a way that it barely maintains the transistor blocked with two low and one high potential at the inputs E1–E3, but is readily switched through when two high and one low input potentials are applied to these inputs. In this manner, a signal will be produced at the output A which is inverted with respect to the majority of the input signals, due to the inversion effected by the transistor 5.

Figure 4:
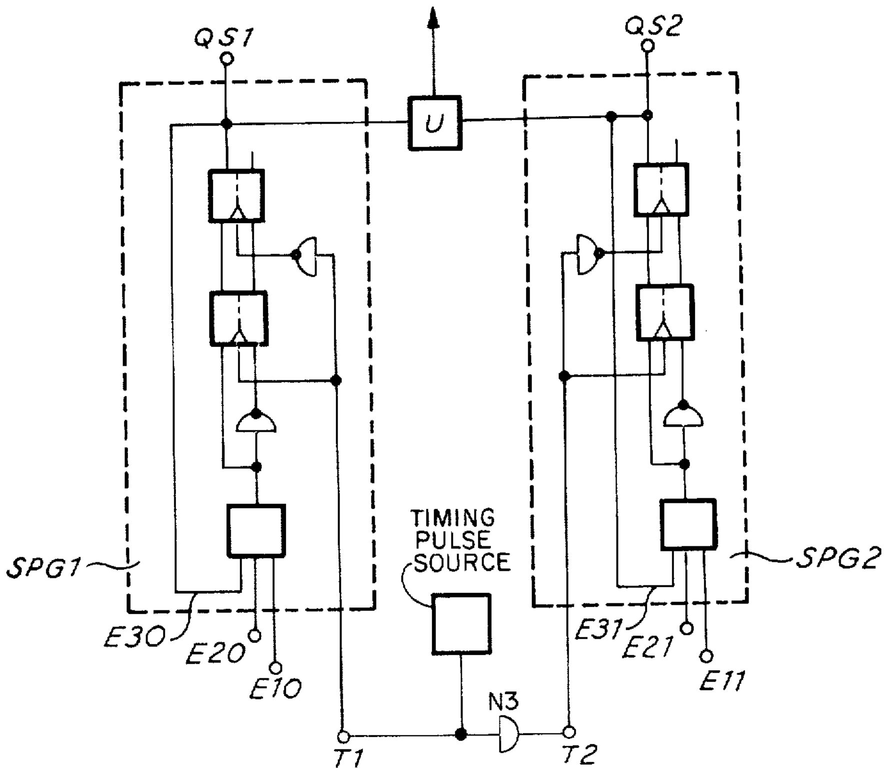
FIG. 4 is a schematic logic representation of a two channel storage component comprising two equal storage circuits and a device controlling the anti-phase of the signals.

The arrangement according to FIG. 4 illustrates two storage circuits SPG1 and SPG2 which are connected as a single storage component. The inputs of one of the storage circuits SPG1 are referenced E10, E20 and E30 and the timing signals are thereby supplied to the input terminal T1. The same is true for the second storage circuit SPG2 wherein the inputs are referenced E11, E21 and E31, and the timing signal is referenced T2. It is essential for this storage component that equal value inputs E10 and E11 or E20 and E21 are fed with anti-phase signal voltages during a normal operation. This also results in anti-phase signal for the inputs E30 and E31. The same is true for the two equal value outputs QS1 and QS2 which also have anti-phase signals during a normal operation. A control device U, which may be constructed according to the teachings of the aforementioned German published application 1,537,379, is provided which continuously controls the anti-phase of the signals at both outputs QS1 and QS2 and which immediately recognizes and announces a phase excursion of the signals independently of the storage state and data flow.

This two channel memory component, including the device U controlling signal anti-phase at the outputs QS1 and QS2, is advantageously embodied as an integrated circuit, whereby it is essential that the timing signals for each storage circuit SPG1 or SPG2, respectively, are still supplied by way of separate lines. It is assumed that these two timing signals can never fail simultaneously due to an interference. However, if this precircumstance is not guaranteed with a switching mechanism, phased timing signals can be advantageously utilized, in the form of, for example, two rectangular voltages which have been shifted at 180° with respect to phase may be employed. Then, an additional inverter N3 is provided for one of the two inputs T1 or T2 of the storage circuits SPG1 or SPG2. Such a measure causes equivalent signals during a simultaneous failure of both timing signals on the lines toward the inputs T1 and T2 of the respective storage component, whereby simultaneously signal equivalence will be provided at the outputs QS1 and QS2, which will be detected by the control device U and announced as a fault.

The application of the storage circuit according to FIG. 1 is not to be limited to an arrangement according to FIG. 4. The described storage circuit operates like an oscillator whose frequency is provided and fixed externally by the timing signals. The phase position of the emitted signal voltages can be adjusted by means of influencing by way of the inputs E1 and E2. The two possible phase positions can therefore be given in a desired succession—with respect to the time raster. Therefore, the circuit can advantageously be applied, for example, as a modulator.

Although I have described my invention by reference to a particular preferred embodiment thereof, many changes and modifications may become apparent to those skilled in the art without departing from the spirit and scope of the invention. I therefore intend to include within the patent warranted hereon all such changes and modifications as may reasonably and properly be included within the scope of my contribution to the art.

What I claim is:

1. An electronic storage circuit with high fault safety for digital data processing of binary switching variables in the form of rectangular signal voltages of a given repetition frequency, comprising:

an RS master flip-flop having a first input, a second input, a first output, and a second output, an RS slave flip-flop having a third input connected to said first output, a fourth input connected to said second output, and a third output, a first inverter, a majority decision circuit having a fourth output connected to said second input and connected via said first inverter to said first input, and having fifth, sixth and seventh inputs, said fifth and sixth inputs receiving said rectangular signal voltages and said seventh input connected to said third output as a feedback input, a second inverter, a first timing input for said RS master flip-flop, a second timing input for said RS slave flip-flop connected to said second inverter, and means for applying a square wave timing signal to said first timing input and to said second inverter, said timing signal having twice the repetition frequency as said given frequency and the trailing edges of said timing signal coinciding with edges of said signal voltages.

2. An electronic storage circuit for digital data processing of binary switching variables in the form of anti-phase rectangular signal voltages of a given repetition frequency, comprising: a pair of dynamic data channels each including an RS master flip-flop having a first input, a second input, a first output, and a second output, an RS slave flip-flop having a third input connected to said first output, a fourth input connected to said second output, and a third output, a first inverter, a majority decision circuit having a fourth output connected to said second input and connected via said first inverter to said first input, and having fifth, sixth and seventh inputs, said fifth and sixth inputs receiving said rectangular signal voltages and said seventh input connected to said third output as a feedback input, a second inverter, a first timing input for said RS master flip-flop, a second timing input for said RS slave flip-flop connected to said second inverter, means for applying a square wave timing signal to said first timing input and to said second inverter, said timing signal having twice the repetition frequency at said given frequency and the trailing edges of said timing signal coinciding with edges of said signal voltages; and an anti-phase detection device connected to each of said third outputs for indicating a deviation from signal anti-phase.

3. An electronic storage circuit according to claim 2, wherein said flip-flop, said majority decision circuits said inverters and said anti-phase detection device are embodied as an integrated circuit.

* * * * *